US011318940B2

(12) United States Patent
Broll et al.

(10) Patent No.: US 11,318,940 B2
(45) Date of Patent: May 3, 2022

(54) METHOD FOR DETERMINING A DYNAMIC VEHICLE DISTANCE BETWEEN A FOLLOWING VEHICLE AND A PRECEDING VEHICLE OF A PLATOON

(71) Applicant: WABCO Europe BVBA, Brussels (BE)

(72) Inventors: Niklas Broll, Ronnenberg (DE); Thomas Dieckmann, Pattensen (DE); Thomas Wolf, Barsinghausen (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 151 days.

(21) Appl. No.: 16/334,758

(22) PCT Filed: Aug. 22, 2017

(86) PCT No.: PCT/EP2017/001002

§ 371 (c)(1),
(2) Date: Mar. 20, 2019

(87) PCT Pub. No.: WO2018/054520

PCT Pub. Date: Mar. 29, 2018

(65) Prior Publication Data

US 2019/0232962 A1 Aug. 1, 2019

(30) Foreign Application Priority Data

Sep. 21, 2016 (DE) ..................... 10 2016 011 325.1

(51) Int. Cl.
*B60W 30/16* (2020.01)
*B60W 30/165* (2020.01)
(Continued)

(52) U.S. Cl.
CPC ........... *B60W 30/165* (2013.01); *G08G 1/162* (2013.01); *G08G 1/22* (2013.01); *H04W 4/46* (2018.02); *B60W 2556/65* (2020.02)

(58) Field of Classification Search
CPC ........... B60W 30/165; B60W 2556/65; B60W 2754/10; B60W 2554/80;
(Continued)

(56) References Cited

U.S. PATENT DOCUMENTS 10,016,895 B2 * 7/2018 Monreal ................ B25J 9/1674
2007/0117525 A1 * 5/2007 Osafune ................ H04W 4/026 455/99

(Continued)

FOREIGN PATENT DOCUMENTS

DE 102004008895 A1 9/2005
DE 102008026686 A1 12/2009

(Continued)

*Primary Examiner* — Abby Y Lin
*Assistant Examiner* — Hossam M Abd El Latif
(74) *Attorney, Agent, or Firm* — Leydig, Voit & Mayer, Ltd.

(57) ABSTRACT

A method for determining a dynamic vehicle distance between a following vehicle and a preceding vehicle of a platoon, wherein a V2V signal is configured to be transmitted in a wireless manner between the following vehicle and the preceding vehicle, includes determining a current maximum following vehicle deceleration of the following vehicle, determining a current transmission time for transmitting information from the preceding vehicle to the following vehicle, determining a current maximum preceding vehicle deceleration of the preceding vehicle, and determining the dynamic vehicle distance comprising a transmission distance and a braking distance difference. The transmission distance indicates a distance traveled by the following vehicle between the preceding vehicle initiating an emergency braking procedure and the following vehicle initiating an emergency braking procedure. The transmission distance is dependent upon the current transmission time.

13 Claims, 3 Drawing Sheets

(51) Int. Cl.

| | |
|---|---|
| ***B60W 30/18*** | (2012.01) |
| ***G05D 1/02*** | (2020.01) |
| ***G08G 1/00*** | (2006.01) |
| ***G08G 1/16*** | (2006.01) |
| ***H04W 4/46*** | (2018.01) |

(58) Field of Classification Search

CPC ..... B60W 30/18109; B60W 2520/105; B60W 30/16; G08G 1/22; G08G 1/162; G08G 2201/0213; G08G 1/0293; H04W 4/46

USPC .......................................................... 701/70

See application file for complete search history.

(56) References Cited

U.S. PATENT DOCUMENTS

| | | | | |
|---|---|---|---|---|
| 2009/0212935 | A1 | 8/2009 | Luo | |
| 2010/0256835 | A1 | 10/2010 | Mudalige | |
| 2010/0256852 | A1* | 10/2010 | Mudalige | G08G 1/22 701/24 |
| 2012/0191318 | A1 | 7/2012 | Holzmann et al. | |
| 2013/0041567 | A1* | 2/2013 | Yamashiro | B60T 7/22 701/96 |
| 2013/0116861 | A1 | 5/2013 | Nemoto | |
| 2013/0144502 | A1 | 6/2013 | Shida | |
| 2015/0012204 | A1 | 1/2015 | Breuer et al. | |
| 2018/0126931 | A1* | 5/2018 | Derag rden | G05D 1/0295 |

FOREIGN PATENT DOCUMENTS

| | | | |
|---|---|---|---|
| DE | 102010013647 | A1 | 2/2011 |
| DE | 102010028637 | A1 | 11/2011 |
| DE | 102011009483 | A1 | 7/2012 |
| DE | 102012002695 | A1 | 8/2013 |
| DE | 102014223999 | A1 | 5/2016 |
| JP | H9249047 | A | 9/1997 |
| JP | H10293899 | A | 11/1998 |
| JP | 2009043174 | A | 2/2009 |
| JP | 2009090718 | A | 4/2009 |
| JP | 2010102522 | A | 5/2010 |
| JP | 2012027862 | A | 2/2012 |
| JP | 2012035817 | A | 2/2012 |
| JP | 2012256167 | A | 12/2012 |
| JP | 2014099098 | A | 5/2014 |
| WO | WO 2016134770 | A1 | 9/2016 |

* cited by examiner

100

50
50
50
10
20
30
40
VF
FF, VF
FF, VF
FF s
sB
VF
SW
FF
60
Adyn
70
90
80
zMax_VF
(mue_VF, ZB_VF,
VB_VF, W)
zMax_FF
(mue_FF, ZB_FF,
VB_FF, W)
w_VF
dvRel
w_FF S1(v_FF, v_VF, Adyn, N)

METHOD FOR DETERMINING A DYNAMIC VEHICLE DISTANCE BETWEEN A FOLLOWING VEHICLE AND A PRECEDING VEHICLE OF A PLATOON

CROSS REFERENCE TO RELATED APPLICATIONS

This application is a U.S. National Stage Application under 35 U.S.C. § 371 of International Application No. PCT/EP2017/001002 filed on Aug. 22, 2017, and claims benefit to German Patent Application No. DE 10 2016 011 325.1 filed on Sep. 21, 2016. The International Application was published in German on Mar. 29, 2018 as WO 2018/054520 A1 under PCT Article 21(2).

FIELD

The invention relates to a method for determining a dynamic vehicle distance between a following vehicle and a preceding vehicle in a platoon.

BACKGROUND

Normally when a plurality of vehicles, preferably commercial vehicles, are driving one behind the other in a platoon or in a convoy, a vehicle distance is fixedly set in dependency upon customary and fixedly preset values for the braking performance and the transmission time of information. As a consequence, it is to be achieved that in a worst-case-scenario an emergency braking procedure that is initiated by a preceding vehicle does not result in the following vehicle colliding with the rear end of the preceding vehicle.

To this end, either a customary or minimally required maximum preceding vehicle decelerations are assumed for the preceding vehicle as fixedly set values and for the following vehicle a customary or a poorest-possible or rather minimally required maximum following vehicle decelerations are assumed and also a customary transmission time for transmitting the information that the preceding vehicle has initiated an emergency braking procedure. As a consequence, it is to be ensured that under these conditions the vehicles in the platoon are still able to brake safely. Simultaneously, the vehicle distance is to be selected such that the fuel consumption may be minimized and the road capacity utilization optimized. As a consequence, both safety and also effectiveness are increased.

However, this is encumbered by the disadvantage that real differences in the transmission time or in the respective maximum vehicle deceleration are not taken into consideration. As a consequence, it is possible that the actual vehicle distance is not optimally set since by way of example the minimally required braking performance leads to a vehicle distance that could not be achieved owing to the actual values. Therefore, although the safety is increased, the effectiveness is not however increased to the optimum. If a customary value of the braking performance is fixedly preset, in order to increase the effectiveness, but the preceding vehicle actually has an improved braking performance, it is possible that a rear-end collision occurs in an emergency braking situation since the vehicle distance has been adjusted to take into account a poorer braking performance of the preceding vehicle and where appropriate an improved braking performance of the following vehicle.

SUMMARY

In an embodiment, the present invention provides a method for determining a dynamic vehicle distance between a following vehicle and a preceding vehicle of a platoon, wherein a V2V signal is configured to be transmitted in a wireless manner between the following vehicle and the preceding vehicle. The method includes determining a current maximum following vehicle deceleration of the following vehicle, determining a current transmission time for transmitting information from the preceding vehicle to the following vehicle, determining a current maximum preceding vehicle deceleration of the preceding vehicle, and determining the dynamic vehicle distance comprising a transmission distance and a braking distance difference. The transmission distance indicates a distance traveled by the following vehicle between the preceding vehicle initiating an emergency braking procedure and the following vehicle initiating an emergency braking procedure. The transmission distance is dependent upon the current transmission time. The braking distance difference indicates a difference between a preceding vehicle braking distance that is predetermined from the maximum preceding vehicle deceleration and a following vehicle braking distance that is predetermined from the maximum following vehicle deceleration.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
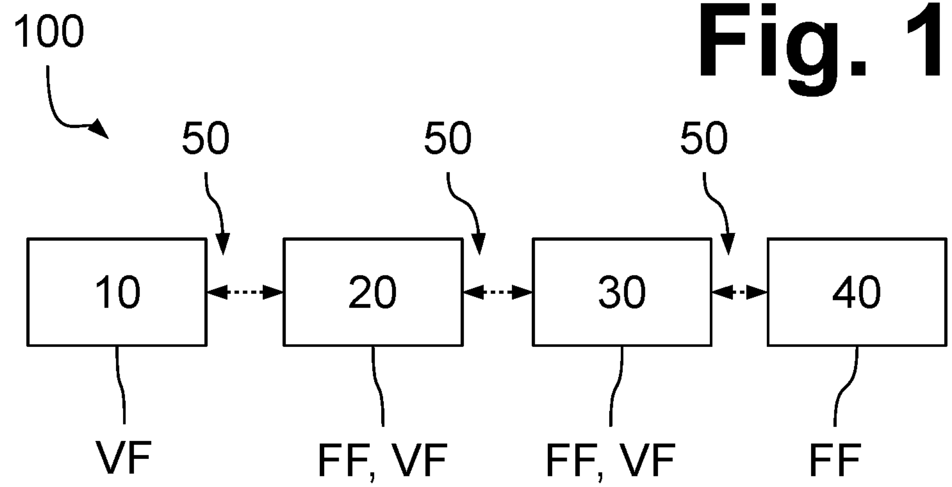
FIG. 1 illustrates a schematic view of a platoon.

Embodiments of the invention propose methods for determining a dynamic vehicle distance, wherein in a simple manner a vehicle distance may be determined that fulfills both the requirements relating to safety during a possible emergency braking procedure and that also optimizes the fuel consumption and the road capacity utilization. Furthermore, embodiments of the invention provide control units for performing such methods.

In accordance with the invention, it is accordingly provided to determine a dynamic vehicle distance between a following vehicle and a preceding vehicle in a platoon in dependence upon a current transmission distance and a braking distance difference. A current transmission distance is defined in this case as the distance that the following vehicle travels until the information that the preceding vehicle has initiated an emergency braking procedure is received by the following vehicle and said following vehicle likewise initiates an emergency brake system in response thereto. The braking distance difference is formed from the difference between a preceding vehicle braking distance and a following vehicle braking distance if during an emergency braking situation the two vehicles each brake with a maximum preceding vehicle deceleration or rather a maximum following vehicle deceleration.

In order to determine the dynamic vehicle distance, a current transmission time in particular is determined in accordance with the invention and furthermore the current maximum preceding vehicle deceleration of the preceding vehicle and the current maximum following vehicle deceleration of the following vehicle are determined in order for the procedure of calculating the dynamic vehicle distance to be able to advantageously use the actually prevailing values.

The current transmission time indicates in this case the time that is actually required to transmit information between the preceding vehicle and the following vehicle, in other words the time between sending information, by way of example that an emergency braking procedure has been initiated, on the preceding vehicle and receiving this information on the following vehicle. The preceding vehicle communicates in this case with the following vehicle and conversely via a wireless data communication or rather vehicle-to-vehicle communication (V2V), which renders it possible for V2V signals to be exchanged in a wireless manner in order to be able to transmit information in a simple manner between the vehicles, said communication procedures rendering it possible in particular to monitor and coordinate the platoon.

The current transmission distance is then obtained from the determined current transmission time, preferably by taking into consideration a dead time, in other words the time it takes for processing the determined V2V signals and for outputting a braking request on the following vehicle, and from a response time, in other words the time after which the braking request is output until a braking pressure is actually built up at the brakes of the following vehicle. In other words, the transmission distance indicates the distance traveled by the following vehicle between the preceding vehicle initiating a braking procedure and the following vehicle initiating an emergency braking procedure. By taking into consideration the dead time and the response time, it is possible to take into consideration other latencies until an emergency braking procedure is initiated with the result that advantageously it is possible to precisely determine the dynamic vehicle distance.

The braking distance difference is determined accordingly from the difference between the braking distances for the currently determined maximum preceding vehicle deceleration and the current maximum following vehicle deceleration, wherein it is possible to use for this purpose a deceleration difference between the maximum preceding vehicle deceleration and the maximum following vehicle deceleration.

As a consequence, it is already possible to achieve the advantage that the procedure of determining the dynamic vehicle distance uses current additional information, in other words in particular uses a current transmission time and a current maximum vehicle deceleration and does not use values that have been previously fixedly parameterized or rather fixedly stored. As a consequence, it is possible to determine a vehicle distance that is dynamically adjusted to the current driving situation. As a consequence, it is possible to set the vehicle distance very precisely both involving safety aspects, in other words by way of example for an emergency braking situation, and also in dependence upon the efficiency, in other words so as to improve fuel consumption and to optimize the road capacity utilization, in particular if while the vehicle is traveling individual additional information changes, because by way of example the physical driving characteristics change, for example from a wet road surface to a dry road surface.

Since the vehicle distance is advantageously adjusted in such a manner that in the case of an emergency braking procedure that is initiated by the preceding vehicle with the maximum preceding vehicle deceleration, the following vehicle that likewise initiates an emergency braking procedure with the maximum following vehicle deceleration comes to a standstill in such a manner that a rear-end collision does not occur. Furthermore, the dynamic vehicle distance is set in such a manner that it is possible to reduce the fuel consumption and the road capacity utilization is optimized. It is consequently possible to take the two aspects into consideration.

The dynamic vehicle distance is obtained in this case advantageously from a distance curve that is stored in the following vehicle, by way of example in a control unit in accordance with the invention, wherein said distance curve indicates for a determined transmission distance the connection between the deceleration difference and the dynamic vehicle distance. If therefore the deceleration difference between the maximum preceding vehicle deceleration and the maximum following vehicle deceleration is known, it is possible to read out the dynamic vehicle distance from the corresponding distance curve for the determined transmission distance.

Advantageously, the maximum preceding vehicle deceleration of the preceding vehicle may be transmitted via the V2V signal from the preceding vehicle to the following vehicle. In other words, the preceding vehicle determines by way of example in a previously performed test braking procedure with full deceleration the maximum preceding vehicle deceleration that is to be achieved and is dependent by way of example upon a current preceding vehicle friction value, a current preceding vehicle brake lining condition, a current preceding vehicle braking response behavior, a current preceding vehicle tire condition, a current preceding vehicle brake condition or is also dependent upon the weather, and transmits this maximum preceding vehicle deceleration that is to be achieved in a wireless manner via the V2V signal via the wireless data communication to the following vehicle. The maximum preceding vehicle deceleration that is to be achieved may also be adjusted while the vehicle is traveling, by way of example in dependence upon a current braking temperature.

The following vehicle may then determine therefrom the dynamic vehicle distance using the relevant maximum following vehicle deceleration. The maximum following vehicle deceleration is obtained in this case by way of example in a similar manner to that for the preceding vehicle from previously performed test braking procedures with full deceleration, where necessary adjusted to the braking temperature.

Consequently, it is possible to use the current physical driving parameters that influence the vehicle distance and consequently to dynamically adjust said vehicle distance to the current conditions in order to set both a safe as well as also an efficient distance between the corresponding vehicles in the platoon or rather convoy of at least the preceding vehicle and the following vehicle.

If a current value is not available for one of the values, in other words the maximum following vehicle deceleration, the maximum preceding vehicle deceleration or the transmission time, because by way of example the wireless data transmission has failed, customary values may be assumed as current in order to be able to safely adjust the vehicle distance advantageously at least for a worst-case-scenario.

A first transmission time is determined advantageously via a time stamp that comprises a sent time at which the V2V signal has been sent by the preceding vehicle and a receiving time at which the V2V signal is received by the following vehicle. In addition, a location stamp may also be used in order to ensure that it concerns the respective preceding vehicle.

As a consequence, in the case of an existing wireless data communication, it is possible advantageously to determine the current transmission time in a safe and simple manner since the time stamp is in any case transmitted. In this case, the information regarding an emergency braking procedure that is initiated by the preceding vehicle is transmitted to the following vehicle via the V2V signal. The procedure of determining the first transmission time may in this case be performed for each desired transmitted V2V signal since a wireless data exchange is in any case constantly taking place.

Should the wireless data communication fail, it is possible to assume as a current transmission time a customary value that is determined by redundancy systems, wherein possible redundancy systems are by way of example a VLC light source and/or a distance sensor system. Accordingly, a second transmission time or a third transmission time may be assumed in lieu of the first transmission time. If the wireless data communication has failed, the preceding vehicle may transmit by way of example via a VLC light source the information that an emergency braking procedure has been initiated. In other words, information is transmitted using light (visible light communication), wherein the VLC light source outputs for this purpose an optical warning signal in the visible spectrum if an emergency braking procedure is initiated by the preceding vehicle. In order to generate and detect that an optical warning signal is output by a VLC light source, the second transmission time is assumed, in other words the time until the following vehicle is able to initiate an emergency braking procedure at the earliest after the preceding vehicle. In other words, the dynamic vehicle status or rather the transmission distance is then determined in dependence upon this second transmission time and also upon the dead time and the response time.

If it is also not possible to use the VLC light source, the third transmission time is assumed in addition to the dead time and the response time for determining the transmission distance, wherein the third transmission time characterizes the time for a distance sensor system to detect a changing relative velocity. In other words, a check is performed using the distance sensor system as to whether the preceding vehicle has initiated an emergency braking procedure and based thereon initiate an emergency braking procedure according to the third transmission time.

The braking distance difference is then preferably determined using the last known values for the maximum preceding vehicle deceleration and the following vehicle deceleration if it is no longer possible to receive a V2V signal in a wireless manner.

Figure 2:
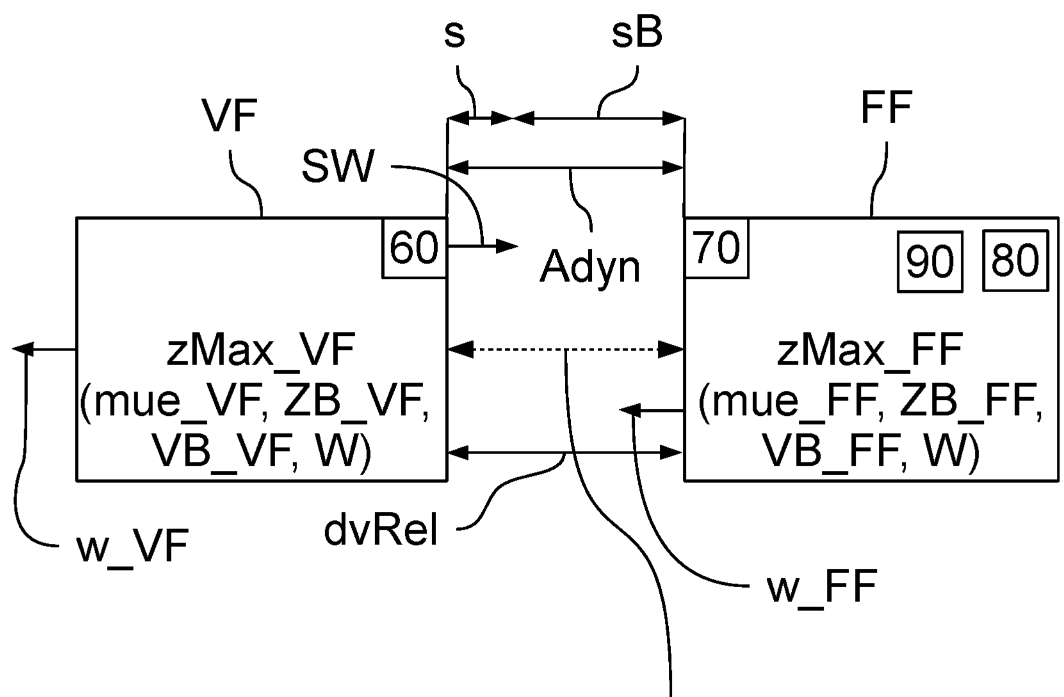
FIG. 2 illustrates a schematic view of a following vehicle and a preceding vehicle.

FIG. 1 illustrates a platoon 100 in which a plurality of vehicles 10, 20, 30, 40, preferably passenger cars and/or commercial vehicles, in particular semitrailers or trucks with trailers, are driving one behind the other. The vehicles 20, 30, 40 are following vehicles FF and the vehicles 10, 20, 30 are preceding vehicles VF, wherein a following vehicle FF follows a preceding vehicle VF, which is driving in front of said following vehicle, at a determined dynamic vehicle distance Adyn in accordance with FIG. 2, wherein the dynamic vehicle distance Adyn indicates a spatial distance. The dynamic vehicle distance Adyn between the following vehicle FF and the respective preceding vehicle VF may vary since it is provided to dynamically set a lowest-possible safe vehicle distance Adyn with respect to the preceding vehicle VF, in other words adjusted to the respective driving situation of the relevant vehicles 10, 20, 30, 40.

The dynamic vehicle distance Adyn is selected in such a manner that a collision between the vehicles 10, 20, 30, 40 may also be prevented in the case of an emergency braking procedure N of the preceding vehicle VF in a dangerous situation. Furthermore, the dynamic vehicle distance Adyn is selected in such a manner that it is possible to optimize fuel consumption and road capacity utilization.

A V2V signal S1 is constantly transmitted between the preceding vehicle VF and the respective following vehicle FF via a wireless data communication 50 (vehicle-to-vehicle communication, V2V) so as to be able to coordinate or rather monitor the platoon 100. The V2V signal S1 transmits in this case in particular a vehicle velocity v_VF, vFF of the respective vehicles VF, FF, the dynamic vehicle distance Adyn and also the information regarding whether an emergency braking procedure N has been initiated. A V2V signal S1 is transmitted within a first transmission time t1 exclusively in a wireless manner.

The dynamic vehicle distance Adyn is determined by each following vehicle FF itself, wherein said distance is selected in such a manner that in the case of an emergency braking procedure N of the following vehicle FF with a maximum possible following vehicle deceleration zMax_FF for the following vehicle FF, it is possible to avoid a collision with the preceding vehicle VF that has initiated an emergency braking procedure N with a maximum possible preceding vehicle deceleration zMax_VF for the preceding vehicle VF. The dynamic vehicle distance Adyn comprises for this purpose a transmission distance s and a braking distance difference sB.

The transmission distance s indicates in this case the distance that the following vehicle FF travels between the point in time t at which the preceding vehicle VF starts to brake and the point in time t at which the following vehicle FF starts to brake, in other words the distance that is required to transmit the information to the following vehicle FF that the preceding vehicle VF has initiated an emergency braking procedure N and it is necessary for the following vehicle FF to implement an emergency braking procedure N. The transmission distance s is in this case by way of example dependent upon the first transmission time t1 for transmitting the V2V signal S1 and also upon a dead time tT and a response time tS, wherein the dead time tT indicates the time for processing the transmitted V2V signals S1 on the following vehicle FF until a braking request is output and the response time tS indicates the time starting with the output of a braking request until a braking pressure is actually built up.

The braking distance difference sB is dependent in particular upon the maximum following vehicle deceleration zMax_FF and upon the maximum preceding vehicle deceleration zMax_VF or rather upon a deceleration difference dzMax=zMax_VF−zMax_FF and indicates the difference between a preceding vehicle braking distance w_VF and a following vehicle braking distance w_FF, if the two vehicles VF, FF during an emergency braking procedure N in each case brake with the maximum preceding vehicle deceleration zMax_VF or rather with the maximum following vehicle deceleration zMax_FF. In other words, it is taken into consideration how intense the following vehicle FF is able to brake in comparison to the preceding vehicle VF. Since by way of example the preceding vehicle VF may in the case of an emergency braking procedure N brake more intensely than the following vehicle FF, it is necessary to select a greater vehicle distance Adyn than in the reverse case, so that a rear-end collision may be reliably avoided.

The dynamic vehicle distance Adyn is consequently obtained from: Adyn=s+sB (dzMax).

Figure 3:
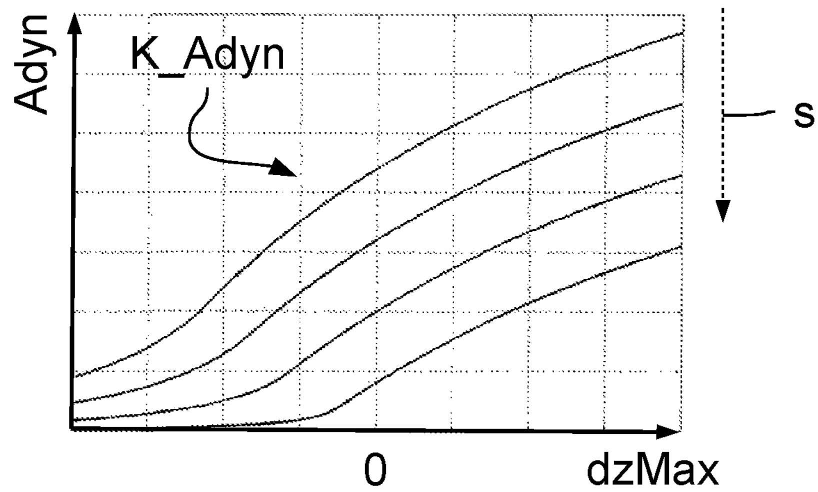
FIG. 3 illustrates exemplary distance curves for determining a dynamic vehicle distance.

Merely by way of example, the dynamic vehicle distance Adyn is plotted in dependence upon different transmission distances s over the deceleration difference dzMax in FIG. 3 in different distance curves K_Adyn, wherein the broken-line arrow indicates that the transmission distance s drops off in this direction for the respective distance curves K_Adyn, in other words the shorter the transmission distance s the shorter also the dynamic vehicle distance Adyn. Consequently, it follows from these distance curves K_Adyn how high the dynamic vehicle distance Adyn is to be selected in the case of a determined transmission distance s in dependence upon the determined maximum following vehicle deceleration zMax_FF and upon the maximum preceding vehicle deceleration zMax_VF.

Distance curves K_A of this type may be stored by way of example in dependence upon the velocity in the following vehicle FF with the result that it is possible in dependence upon the known values for the maximum following vehicle deceleration zMax_FF, the maximum preceding vehicle deceleration zMax_VF and upon the transmission distance s to determine the dynamic distance Adyn in the following vehicle FF.

If neither the current transmission distance s, because by way of example a first transmission time t1 is not known, nor the maximum preceding vehicle deceleration zMax_VF are available, customary values for these variables are adjusted for a worst-case-scenario.

The actual or rather current maximum following vehicle deceleration zMax_FF of the following vehicle FF is obtained from the physical driving states of the following vehicle FF and may be determined by way of example in the previously performed test braking procedures with maximum deceleration by the following vehicle FF. The maximum following vehicle deceleration zMax_FF is in this case by way of example dependent upon a current following vehicle friction value mue_FF, a current following vehicle brake lining condition ZB_FF, a current following vehicle braking response behavior VB_FF or other current vehicle parameters that indicate the braking performance of the respective following vehicle FF.

In order to determine the transmission distance s so as to optimize the procedure of determining the dynamic vehicle distance Adyn, the first transmission time t1 is currently determined that in the normal operation of a platoon 100 may be assumed as time for a data transmission in order to transmit in particular the information regarding an initiated emergency braking procedure N.

Since data is constantly being exchanged in a wireless manner via the V2V signal S1, it is possible to constantly currently determine the first transmission time t1 while the vehicle is traveling. This is achieved by way of example via a time stamp that is transmitted by the preceding vehicle VF with each V2V signal S1 and indicates a sent time tA. It is possible from the difference to determine the actual first transmission time t1 via the received time tE on the following vehicle FF. In order to perform a plausibility check that the V2V signal S1 is also actually coming from the preceding vehicle VF, it is furthermore possible to provide a location stamp which includes the movement data of the respective preceding vehicle VF.

Henceforth, a precise time offset between a possible start of the emergency braking procedure N in the preceding vehicle VF and a possible start of the emergency braking procedure N in the following vehicle FF is obtained from the actual first transmission time t1 by taking into consideration the dead time tT and the response time tS. In turn, an actual value for the transmission distance s (t1, tT, tS) is obtained therefrom, in other words the distance that the following vehicle FF travels in this actual first transmission time t1 by taking into account a dead time tT and a response time tS.

Therefore, if an emergency braking procedure N is initiated by the preceding vehicle VF and this information is transmitted via the V2V signal S1 to the following vehicle FF, the following vehicle FF will likewise initiate an emergency braking procedure N at the earliest after traveling the transmission distance s with the result that this transmission distance s is taken into consideration during the procedure of determining the dynamic vehicle distance Adyn by way of example in accordance with the invention FIG. 3.

In order also to determine an optimized braking distance difference sB by taking into consideration the braking performance of the preceding vehicle VF (zMax_VF) and the relevant following vehicle FF (zMax_FF) or rather its deceleration difference dzMax=zMax_VF−zMax_FF, an actual or rather current maximum preceding vehicle deceleration zMax_VF is also determined in not to have to assume the value that has been adjusted for the worst-case-scenario.

For this purpose, it is determined by the respective preceding vehicle VF in a similar manner to that also by the following vehicle FF, by way of example in test braking procedures with full deceleration, how intense or rather with which maximum preceding vehicle deceleration zMax_VF the respective preceding vehicle VF is actually able to brake in an emergency braking situation N. From the moment in time that the respective preceding vehicle VF joins the platoon 100, this determined maximum preceding vehicle deceleration zMax_VF is constantly output via the V2V signal S1 and consequently transmitted to the other following vehicles FF of the platoon 100.

The respective following vehicle FF may then using the braking performance zMax_FF, zMax_VF that is currently established for the relevant following vehicle FF and currently established by the preceding vehicle VF determine the braking distance difference sB from the deceleration difference dzMax for the corresponding transmission distance s in accordance with FIG. 3.

Figure 4:
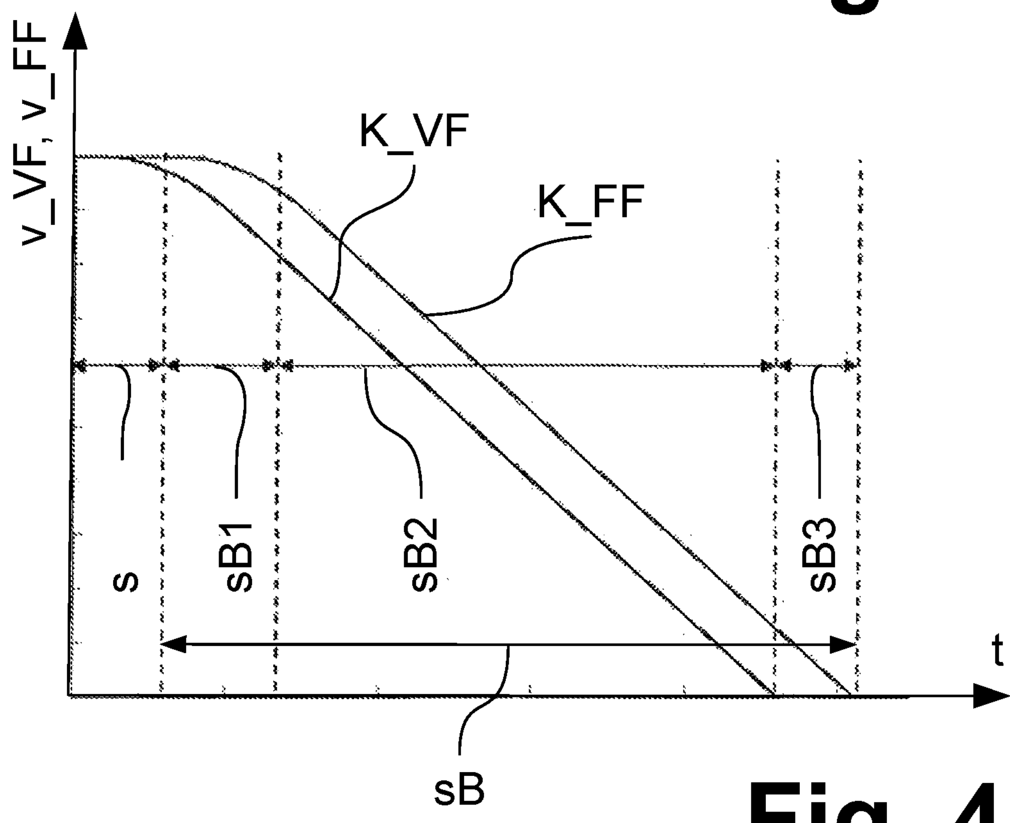
FIG. 4 illustrates a time graph of a following vehicle deceleration and a preceding vehicle deceleration in the case that an emergency braking procedure has been performed.
Figure 5:
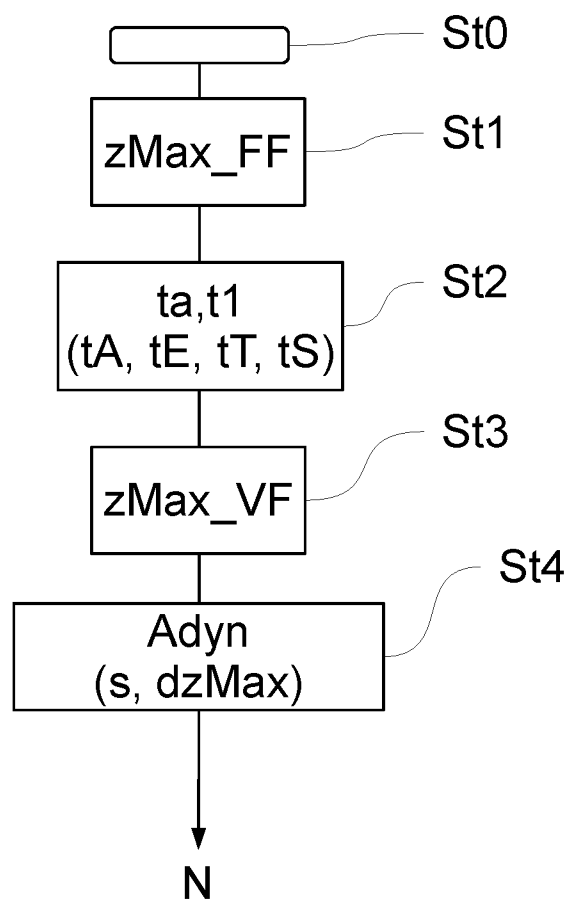
FIG. 5 illustrates a flow diagram of a method according to an embodiment of the invention.

The dynamic vehicle distance Adyn is represented for a transmission distance s by way of example in FIG. 4 with the aid of velocity graphs K_VF, K_FF, wherein the respective braking distance w_VF, w_FF is obtained using an integration method from the respective velocity graph K_VF, KFF. In this case, it is assumed that the maximum preceding vehicle deceleration zMax_VF is equal to the maximum following vehicle deceleration zMax_FF, by way of example in each case 5 $m/s^2$ since the velocity graphs K_VF, K_FF have the same maximum positive gradient. The velocity graphs K_VF, K_FF or rather braking distance difference sB, which is obtained using an integration method from the velocity graphs K_VF, K_FF or their difference may be divided into different partial braking distances sB1, sB2, sB3:

A first partial braking distance sB1 indicates in this case the distance that the following vehicle FF travels after the transmission distance s until the preceding vehicle VF and the following vehicle FF have a constant preceding vehicle deceleration z_VF or rather a constant following vehicle deceleration z_FF, wherein these constant decelerations z_VF, z_FF in each case are predetermined by means of the maximum preceding vehicle deceleration zMax_VF or rather the maximum following vehicle deceleration zMax_FF.

A second partial braking distance sB2 indicates the distance that the following vehicle FF travels while both the preceding vehicle VF and also the following vehicle FF brake constantly with the maximum preceding vehicle deceleration zMax_VF or rather the maximum following vehicle deceleration zMax_FF.

A third partial braking distance sB3 indicates in this exemplary embodiment the distance that the following vehicle FF travels from the point in time t after which the preceding vehicle VF is at a standstill until the point in time t at which the following vehicle FF (after the start of the braking procedure) achieves the same velocity as the preceding vehicle VF.

If the values for the maximum preceding vehicle deceleration zMax_VF and the maximum following vehicle deceleration zMax_FF are different, then it is necessary to adjust the positive gradients of the velocity graphs K_VF, K_FF accordingly, wherein it is also possible for the respective velocity graphs K_VF, K_FF to intersect one another. Accordingly, the partial braking distances sB1, sB2, sB3 and consequently also the dynamic vehicle distance Adyn change.

The dynamic vehicle distance Adyn is consequently established in such a manner that in the case of a braking procedure of the following vehicle FF with the respective partial braking distances sB1, sB2, sB3, contact is not made with the preceding vehicle VF, in this respect also the transmission distance s is also taken into consideration.

In other words, if an emergency braking procedure N of the preceding vehicle VF is established, it is possible using the dynamically set vehicle distance Adyn to ensure that the following vehicle FF does not make contact with the preceding vehicle VF in the event that under the assumed conditions said following vehicle likewise initiates an emergency braking procedure N after by way of example the first transmission time t1 and also the dead time tT and the response time tS.

In addition to the V2V signal S1, the preceding vehicle VF may also output via a VLC light source 60 an optical warning signal SW to the following vehicle FF, wherein the VLC light source 60 represents a redundancy system for wireless transmission. In other words, information is transmitted from the preceding vehicle VF to the following vehicle FF using light (visible light communication), wherein the VLC light source 60 outputs for this purpose the optical warning signal SW in the visible spectrum if an emergency braking procedure N is initiated by the preceding vehicle VF. The following vehicle FF constantly records whether the VLC light source 60 outputs a warning signal SW and in the presence of the optical warning signal SW forwards a request for an emergency braking procedure N to be performed by way of example in the event that it is not possible to detect a V2V signal S1. The dynamic vehicle distance Adyn is subsequently determined using a transmission distance s for which a second transmission time t2 is assumed that takes into consideration the generation and detection of the warning signal SW. The last value transmitted via the V2V signal S1 is assumed as the maximum preceding vehicle deceleration zMax_VF. If this is not known, then customary values for a worst-case-scenario are used. As a consequence, it is possible to detect any failure of the wireless data communication 50 and an emergency braking procedure N of the preceding vehicle VF may be detected via the optical warning signal SW.

In the event that the transmission via the VLC light source 60 also fails, it is possible for the following vehicle FF using in addition also a distance sensor system 70, by way of example RADAR, LIDAR, camera braking light detection system, which represent a further redundancy system, to detect how high a change of a relative velocity dvRel is between the following vehicle FF and the preceding vehicle VF. The dynamic vehicle distance Adyn is subsequently determined using a transmission distance s for which a third transmission time t3 is assumed that takes into consideration the detection of the change in the relative velocity dvRel via the distance sensor system 70. The value last transmitted via the V2V signal S1 is assumed as the maximum preceding vehicle deceleration zMax_VF. If this is not known, then customary values for a worst-case-scenario are used. In this case, following a defined change in the relative velocity dvRel an emergency braking procedure N is initiated by the following vehicle FF since it is assumed that also the respective preceding vehicle VF is performing an emergency braking procedure N.

If a dynamic vehicle distance Adyn has been determined in the following vehicle FF, this is set by controlling a brake system 80 and/or controlling a drive system 90 of the following vehicle FF in order to control the following vehicle FF safely in the platoon 100.

In accordance with FIG. 4, a distance may be determined and set in accordance with a method in accordance with the invention as follows.

In an initial step St0, the method starts by way of example after the following vehicle FF joins a platoon 100.

In a first step St1, a relevant maximum following vehicle deceleration zMax_FF is determined from physical driving conditions of the relevant following vehicle FF, which may be determined by way of example in previously performed test braking procedures with full deceleration by the following vehicle FF.

In a second step St2, a first transmission time t1 is determined from the data transmission via the V2V signal S1 by taking into consideration the sent time to at which the V2V signal S1 has been sent by the preceding vehicle VF, and the received time tE at which the relevant following vehicle FF has received the V2V signal S1. If the data transmission is disturbed, the second transmission time t2 is used when the VLC warning light 60 is used or the third transmission time t3 is used when the distance sensor system 70 is used, as described above.

In a third step St3, the maximum preceding vehicle deceleration zMax_VF that is determined by the preceding vehicle VF and transmitted via the V2V signal S1 is recorded, which may be determined by way of example in previously performed test braking procedures with full deceleration by the preceding vehicle VF.

In a fourth step St4, the dynamic distance Adyn is determined from the respective transmission time t1, t2, t3 and also from the maximum preceding vehicle deceleration zMax_VF and from the maximum following vehicle deceleration zMax_FF or rather from the deceleration difference dzMax=zMax_VF−zMax_FF in accordance with FIG. 3, said dynamic distance being obtained from the transmission distance s that is dependent upon the first, second or third transmission time t1, t2, t3 and also the dead times tT and the response time tS, and the braking distance difference sB that comprises the partial braking distances sB1, sB2, sB3.

Hereafter, the dynamic vehicle distance Adyn may be set by means of controlling the brakes and/or the drive of the following vehicle FF in order to increase the safety in the platoon 100 while simultaneously reducing fuel consumption. As a consequence, it is possible to avoid a rear-end collision in the case of an emergency braking procedure N being initiated by the preceding vehicle VF with the maximum preceding vehicle deceleration zMax_VF, to which the following vehicle FF likewise reacts with an emergency braking procedure N with a maximum following vehicle deceleration zMax_FF.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

10, 20, 30, 40 Vehicles of the platoon
50 Wireless data communication
60 VLC light source
70 Distance sensor system
80 Brake system
90 Drive system
100 Platoon
Adyn Dynamic distance
dvRel Relative velocity
dzMax Deceleration difference
FF Following vehicle
K_FF Velocity graph of the following vehicle
K_VF Velocity graph of the preceding vehicle
mue_FF Following vehicle friction value
mue_VF Preceding vehicle friction value
N Emergency braking procedure
t Point in time
t1 First transmission time (V2V)
t2 Second transmission time (VLC)
t3 Third transmission time (Distance sensor system)
tA Sent time
tE Received time
tT Dead time
tS Response time
S1 V2V signal
s Transmission distance
sB Braking distance difference
sB1, sB2, sB3 Partial braking distances
sW Warning signal
v_FF Following vehicle velocity
v_VF Preceding vehicle velocity
VB_FF Following vehicle braking response behavior
VB_VF Preceding vehicle braking response behavior
VF Preceding vehicle
W Weather
w_FF Following vehicle braking distance
w_VF Preceding vehicle braking distance
ZB_FF Following vehicle brake lining condition
ZB_VF Preceding vehicle brake lining condition
z_FF Following vehicle deceleration
zMax_FF Maximum vehicle deceleration of the following vehicle
zMax_VF Maximum vehicle deceleration of the preceding vehicle
z_VF Preceding vehicle deceleration
St0, St1, St2, St3, St4 Steps of a method

The invention claimed is:

1. A method for determining a dynamic vehicle distance between a following vehicle and a preceding vehicle of a platoon, wherein a vehicle-to-vehicle (V2V) signal is configured to be transmitted in a wireless manner between the following vehicle and the preceding vehicle, the method comprising:

determining a current maximum following vehicle deceleration of the following vehicle;

determining a current transmission time for transmitting information from the preceding vehicle to the following vehicle;

determining a current maximum preceding vehicle deceleration of the preceding vehicle; and determining the dynamic vehicle distance comprising a transmission distance and a braking distance difference, wherein the transmission distance indicates a distance traveled by the following vehicle between the preceding vehicle initiating an emergency braking procedure and the following vehicle initiating an emergency braking procedure, wherein the transmission distance is dependent upon the current transmission time, wherein the braking distance difference indicates a difference between a preceding vehicle braking distance that is predetermined from the maximum preceding vehicle deceleration and a following vehicle braking distance that is predetermined from the maximum following vehicle deceleration, and wherein the transmission distance is dependent upon a dead time comprising an amount of time for processing the determined V2V signals and for outputting a braking request on the following vehicle.

2. The method as claimed in claim 1 wherein the braking distance difference is obtained from a deceleration difference between the current maximum preceding vehicle deceleration and the current maximum following vehicle deceleration.

3. The method as claimed in claim 2, wherein the dynamic vehicle distance is obtained from a distance curve stored in the following vehicle, and wherein, for a determined transmission distance, the distance curve indicates a correlation between the deceleration difference and the dynamic vehicle distance.

4. The method as claimed in claim 1, wherein the current maximum preceding vehicle deceleration of the preceding vehicle is transmitted via the V2V signal by the preceding vehicle to the following vehicle.

5. The method as claimed in claim 4 wherein the current maximum preceding vehicle deceleration is determined by the preceding vehicle.

6. The method as claimed in claim 1, wherein if the preceding vehicle does not transmit a maximum preceding vehicle deceleration via the V2V signal or the V2V signal is not transmitted, a customary value for the preceding vehicle deceleration or the last transmitted maximum preceding vehicle deceleration is assumed as the current maximum preceding vehicle deceleration.

7. The method as claimed in claim 1, wherein a first transmission time is determined as a current transmission time from a sent time at which the V2V signal is sent by the preceding vehicle, and from a received time at which the V2V signal is received by the following vehicle.

8. The method as claimed in claim 1, wherein in the event that it is not possible to determine a first transmission time from the transmission of the V2V signal, a last determined first transmission time is assumed as the current transmission time, or a second transmission time is determined as the transmission time, the second transmission time characterizing a time for generating and detecting an optical warning signal that is output by a visible light communication (VLC) light source, or a third transmission time is determined as the transmission time, the third transmission time characterizing a time for detecting a changing relative velocity by a distance sensor system.

9. The method as claimed in claim 1, wherein in order to determine the transmission distance, in addition to the transmission time, a dead time and a response time are additionally taken into consideration.

10. The method as claimed in claim 1, wherein the maximum following vehicle deceleration is determined by the following vehicle.

11. The method as claimed in claim 1, wherein the determined dynamic vehicle distance between the preceding vehicle and the following vehicle is set by controlling the brakes and/or a drive of the following vehicle.

12. The method as claimed in claim 1, wherein the transmission distance is dependent upon a response time comprising an amount of time after which a braking request is output until a braking pressure is actually built up at the brakes of the following vehicle.

13. A method for determining a dynamic vehicle distance between a following vehicle and a preceding vehicle of a platoon, wherein a vehicle-to-vehicle (V2V) signal is configured to be transmitted in a wireless manner between the following vehicle and the preceding vehicle, the method comprising:

determining a current maximum following vehicle deceleration of the following vehicle;

determining a current transmission time for transmitting information from the preceding vehicle to the following vehicle;

determining a current maximum preceding vehicle deceleration of the preceding vehicle; and determining the dynamic vehicle distance comprising a transmission distance and a braking distance difference, wherein the transmission distance indicates a distance traveled by the following vehicle between the preceding vehicle initiating an emergency braking procedure and the following vehicle initiating an emergency braking procedure, and wherein the transmission distance is dependent upon:

the current transmission time, wherein the braking distance difference indicates a difference between a preceding vehicle braking distance that is predetermined from the maximum preceding vehicle deceleration and a following vehicle braking distance that is predetermined from the maximum following vehicle deceleration, a dead time comprising an amount of time for processing the determined V2V signals and for outputting a braking request on the following vehicle, and a response time comprising an amount of time after which the braking request is output until a braking pressure is actually built up at the brakes of the following vehicle.

* * * * *